United States Patent [19]

Tomita et al.

[11] Patent Number: 4,487,285

[45] Date of Patent: Dec. 11, 1984

[54] ENGINE SUSPENSION SYSTEM

[75] Inventors: Takao Tomita, Niiza; Yuji Kishizawa, Kawagoe, both of Japan

[73] Assignee: Honda Motor Co., Ltd., Tokyo, Japan

[21] Appl. No.: 455,947

[22] Filed: Jan. 6, 1983

[30] Foreign Application Priority Data

Jan. 12, 1982 [JP] Japan .................................. 57-3061
Jan. 12, 1982 [JP] Japan .................................. 57-3062

[51] Int. Cl.³ .............................................. B60K 5/12
[52] U.S. Cl. .................................. 180/228; 180/291
[58] Field of Search ............... 180/219, 228, 299, 291, 180/296, 300, 309, 89.2; 248/638, 659

[56] References Cited

U.S. PATENT DOCUMENTS 4,412,597 11/1983 Aiba .................................... 180/228

FOREIGN PATENT DOCUMENTS 96405 10/1922 Switzerland ....................... 180/228

Primary Examiner—Joseph F. Peters, Jr.
Assistant Examiner—D. Lynn Fugate
Attorney, Agent, or Firm—Arthur L. Lessler

[57] ABSTRACT

A plurality of links each have two junctions disposed on respective ones of a plurality of straight lines extending radially from the center of percussion of an engine located at a predetermined fixed position in the body of a vehicle, which is formed of a framework. The two junctions of each link are pivotally joined to the engine and to the body by means of first and second joining means, respectively, to suspend the engine in a manner allowing turning of same with respect to the center of percussion. A third joining means supports the exhaust pipe of the engine at its holding part for pivotal movement with respect to the center of percussion.

14 Claims, 7 Drawing Figures

ENGINE SUSPENSION SYSTEM

BACKGROUND OF THE INVENTION

The present invention relates to an engine suspension system which is capable of preventing transmission of vibrations of the engine to the body of a vehicle on which the engine is installed.

An engine for a motorcycle, in general, is fixed directly to the body frame of the vehicle to prevent a jolting motion of the engine which can result from fluctuations in driving force applied to the driving chain. The exhaust pipe is fastened to an exhaust port of the engine at its one end and to the body at its other end. Recent diffusion of engines having greater capacities for motorcycles causes a problem of increased vibrations of engines. Nevertheless, improved riding comfortableness is required of motorcycles. The above conventional engine mounting mechcanism is incapable of suppressing transmission of engine vibrations to the body and of meeting such a requirement. Furthermore, the conventional engine mounting mechanism has the possibility that engine vibrations apply a bending load to the exhaust pipe, resulting in a shortened effective life of the exhaust pipe. Therefore, development of an engine suspension mechanism is desired, which is capable of effectively minimizing transmission of engine vibrations to the vehicle body as well as reducing the bending load applied to the exhaust pipe to a minimum.

SUMMARY OF THE INVENTION

It is an object of the invention to provide an engine suspension system of a simple construction which is capable of reducing the transmission of engine vibrations to the body of the vehicle.

It is a further object of the invention to provide an engine suspension system which is capable of eliminating a bending load applied to the exhaust pipe due to engine vibrations to obtain a lengthened life of the exhaust pipe.

It is a still further object of the invention to provide an engine suspension system which further includes engine supporting stoppers and is capable of utilizing the driving reaction force of the secondary reduction mechanism for the engine vibration damping effect of engine supporting stoppers.

According to the present invention, a plurality of links each have two junctions aligned on respective ones of a plurality of straight lines extending radially from the center of percussion of the engine which is located at a fixed position in the vehicle body. Each link is pivotally joined to the engine at its one junction by means of a first joining means and to the frame of the vehicle body at its other junction by means of a second joining means. Thus, the engine is suspended by the links turnably or rockably with respect to the center of percussion on the frame and thereby the transmission of engine vibrations to the vehicle body is reduced.

Furthermore, the exhaust pipe has its one end secured to the exhaust port of the engine and its other end disposed pivotably with respect to the center of percussion to the vehicle body by means of a third joining means. Preferably, engine supporting stoppers are secured either to a bottom surface of the engine or to the frame of the vehicle body for abutment with the corresponding links disposed opposite the bottom surface of the engine or the same bottom surface when the engine is moved downward, while the center of percussion is located approximately at the central part of a chain-driven secondary reduction mechanism of the engine.

Furthermore, the rear end of the engine can be joined for swinging motion to the frame of the body by means of a fourth joining means, if necessary.

These and other objects, features and advantages of the present invention will more readily be understood from the following detailed description with reference to accompanying drawings.

DETAILED DESCRIPTION

First, the principle of the present invention will be described briefly.

The principal source of vibrations of an engine is an inertial force, particularly a primary component of the inertial force (a component along the direction of the reciprocating motion of the reciprocating parts), generated by the reciprocating motion of the reciprocating parts including a piston(s) and a connecting rod(s) of the crank system of the engine. To reduce engine vibrations, a crank weight is generally employed, which is attached to a crank web disposed opposite the reciprocating parts of the crank system so as to counterbalance the primary component of the inertial force of the reciprocating parts by a centrifugal force generated by the rotation of the crank weight.

Figure 1:
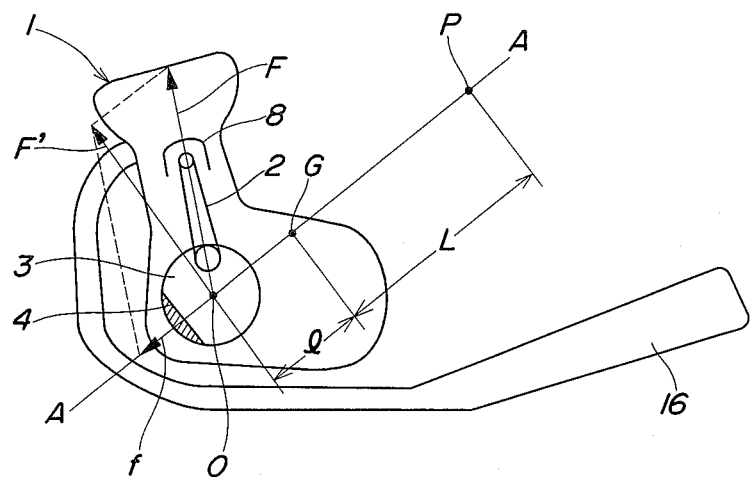
FIG. 1 is a diagrammatic view illustrating the dynamic principle of an engine suspension system according to the present invention.

The inertial force generated by the motion of the crank system can be directed in an optional direction by suitably selecting the position and weight of the crank weight attached to the crank web. Referring to FIG. 1, the resultant force F' of the primary inertial force F acting in the axial direction of a connecting rod 2 pivotally coupled at one end to a piston 8 and the centrifugal force f of a crank weight 4 fastened to a crank web 3 can be directed at an optional angle to the axis of the connecting rod 2 by selecting the magnitude and direction of the centrifugal force f, which is dependent on the weight of the crank weight 4 and the position of the crank weight 4 on the crank web 3. Accordingly, the resultant force F' can be made to act perpendicularly to an optional line passing the center of gravity G of the engine, a line A—A, for instance. In such a case, point P on the line A—A coincides with the center of percussion of the engine 1 when the point P meets the following condition as defined by Equation (1).

$$l \times L = I_g / W \qquad (1)$$

where l is the distance between the center of gravity G of the engine 1 and the line of action of the resultant force F′, L is the distance between the center of gravity G of the engine 1 and the center of percussion P, Ig is the moment of inertia of the engine 1 about an axis passing the center of gravity G of the engine 1, and W is the weight of the engine 1.

In this case, the engine 1 is turned about the center of percussion P by the resultant force F′ generated during the operation. That is, the center of a percussion P will not be moved in any direction by the resultant force F′ generated during the operation of the engine 1. As shown in FIG. 1, the center of gravity G of the engine 1 is located above and behind the center O of the crankshaft.

Accordingly, as will be described hereinafter, the resultant force F′, namely, the primary inertial force F caused by reciprocating motions of the reciprocating parts of the engine 1, can be counterbalanced with the turning motion of the engine 1 by suspending the engine 1 from the vehicle body by means of a plurality of links extending radially of the center of percussion P so as to allow the engine to turn along the circumference of a circle having its center at the center of percussion P, whereby the engine vibrations caused by the primary inertial force F is suppressed to effectively prevent the transmission of the engine vibrations to the vehicle body.

Figure 2:
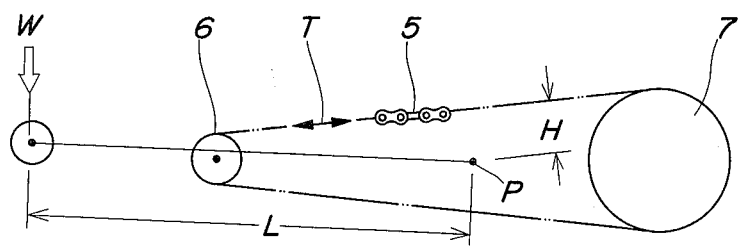
FIG. 2 is a diagrammatic view illustrating, similarly to FIG. 1, the dynamic principle of a chain drive system.

Referring to FIG. 2, in a vehicle having a chain-driven secondary reduction mechanism, a counterclockwise moment W×L and clockwise moment T×L act about the center of percussion P. A force acts on the engine 1 to lift same when those moments are interrelated to meet a condition as defined by the following Equation (2).

$$T \geqq W \times L/H \quad (2)$$

where W is the weight of the engine, L is the distance between the center of gravity G of the engine and the center of percussion P, T is the tension of the chain 5, and H is the perpendicular distance between the center of percussion P and the driving chain 5.

In view of the Equation (2), the deadweight of the engine can be counterbalanced by the driving reaction force of the driving chain 5 by locating the center of percussion P approximately at the center of the driving system of the secondary reduction mechanism including the driving chain 5, a sprocket 6 fitted on the output shaft, not shown, of the engine 1 and a sprocket 7 fitted on the rear axle, not shown, and setting the perpendicular distance H at a predetermined value meeting the condition of Equation (2), to thereby reduce impulsive load which works on engine supporting stoppers, which will be described hereinafter, and accordingly lengthen the service life of the engine supporting stoppers and enhance the vibration damping function of same.

Furthermore, the exhaust gas inlet end of an exhaust pipe 16 is fixedly attached to the engine while the mount of the exhaust pipe 16 is pivotally supported at the center of percussion P, so that the exhaust pipe 16 can be turned together with the engine, whereby no bending load is applied to the exhaust pipe 16, which would otherwise be caused by the vibrating movement of the engine and applied to the exhaust pipe 16.

An embodiment of an engine suspension system which is based upon the above described dynamic principle will be described hereinafter by referring to FIG. 3.

Figure 3:
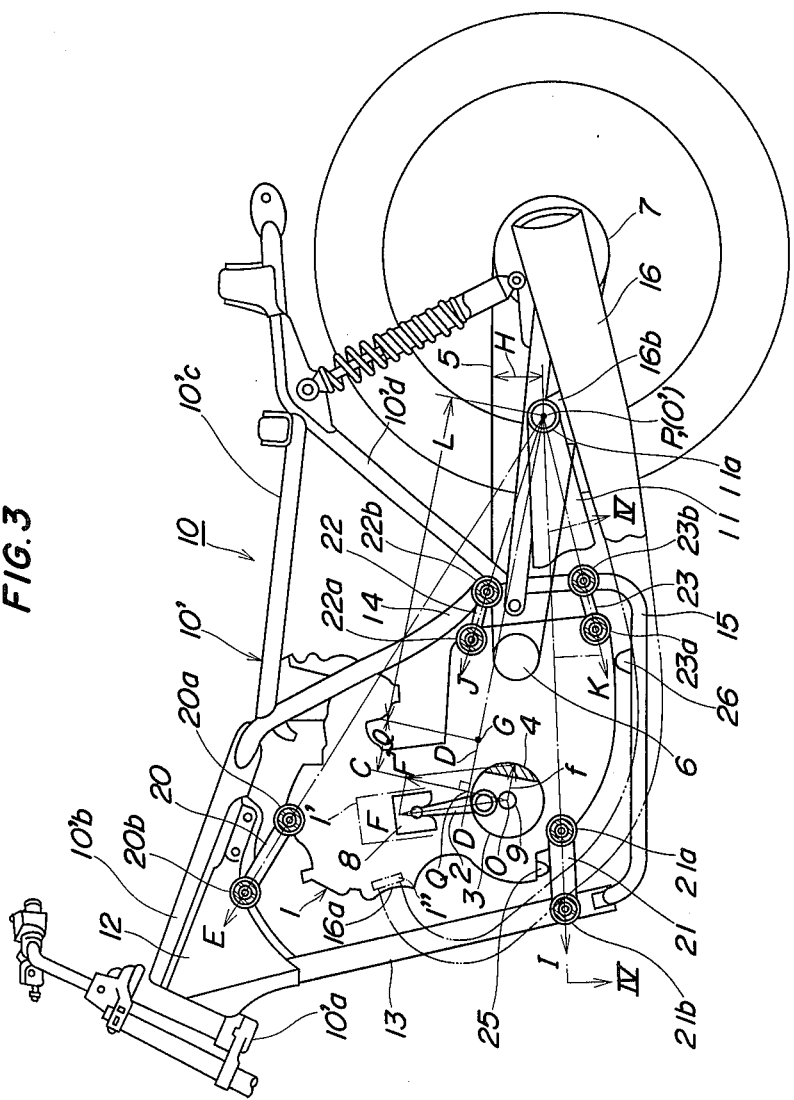
FIG. 3 is a schematic side elevation of a preferred embodiment of an engine suspension system according to the present invention.

In FIG. 3, a piston 8 which reciprocates within the cylinder 1′ of an engine 1 mounted on a motorcycle is connected by means of a connecting rod 2 to a crankshaft 9. The body 10 of the motorcycle is formed of a semi-double cradle frame 10′. The frame 10′ comprises a steering head pipe 10′a, a tank rail 10′b extending from the head pipe 10′a downwardly and rearwardly of the body 10, a down tube 13 also downwardly and rearwardly extending from the head pipe 10′a, a triangular frame 12 fixedly joined to the tank rail 10′b and the down tube 13, a pair of main frames 14 (only one of them is shown) arranged on both sides of the body 10 and each joined at one end to the tank rail 10′b, a pair of generally L-shaped lower tubes 15 (only one of them is shown), each joined at one end to a lower end of the corresponding main frame 14, and seat pipes 10′c and back stays 10′d (only one of each is shown) forming a substantially triangular framework in cooperation with the main frames 14.

A pair of step holders 11 (only one of them is shown) are arranged on the opposite sides of the body 10 behind the engine 1 with their respective front ends, not shown, fixed to the frame 10′. A hole 11b (in FIG. 5) is formed in a free rear end 11a of one of the step holders 11. The center O′ of one the holes 11b is coincident with the center of percussion P of the engine 1 as described hereunder. In FIG. 3, let a point Q represent the intersecting point between a line O′D connecting the center O′ of the hole 11b and the center of gravity G of the engine 1 and a perpendicular OC extending from the center O of the crankshaft 9 to the line O′D, and let l and L represent the distance from the center of gravity G to the point Q and the distance from the same center G to the center O′ of the hole 11b, respectively. Then, the center O′ of the hole 11b is located so as to provide the distance L which meets the condition defined by Equation (1). In addition, the weight and location of the crank weight 4 secured to the crank web 3 on the crankshaft 9 are set so that the acting direction of the resultant force F′ of the centrifugal force f of the crank weight 4 and the primary inertial force F of the reciprocating parts including the connecting rod 2 and the piston 8 of the engine 1 is coincident with the extending direction of the perpendicular or line OC, namely, the direction of line of action of the resultant force F′.

More practically, the direction and magnitude of the primary inertial force F of the engine 1, which are dependent on the specifications of the reciprocating parts of the engine 1, such as the weight of the piston, and the angle at which the engine 1 is disposed on the body 10, that is, the angle of the engine cylinders relative to the vehicle body 10, are calculated. Then, the direction and magnitude of the centrifugal force f are determined on the basis of the calculated values of the primary inertial force F so as for the resultant force F′ to act along the line OC. Then, the weight and position on the crank web 3 of the crank weight 4 are determined so as to satisfy the determined direction and magnitude of the centrifugal force f. On the other hand, once the specifications of the engine 1 have been finalized, the weight W, the moment of inertia Ig and the distance l can be determined. The determined values of W, Ig and l are substituted into Equation (1) to determine the value of L meeting the condition of Equation (1). The construction of the crank system of the engine 1 is, designed and the location of the center of percussion P, namely, the location of the center O' of the hole 11b is set on the basis of those calculated values.

Furthermore, the center O' of the hole 11b is located approximately at the center of the secondary reduction mechanism comprising the driving chain 5, the driving sprocket 6 fitted on the output shaft, not shown, of the engine 1 and engaging with the driving chain 5 and the driven sprocket 7 fitted on the rear axle, not shown, and engaging with the driving chain 5, and at the same time, the location of the center O' of the hole 11b is determined so that the distance H between the center O' and the driving chain 5 meets the condition defined by Equation (2) and a force will act on the engine 1 to upwardly urge same during the operation of the engine 1. Accordingly, the center of percussion P which is coincident with the center O' meets the respective conditions of Equations (1) and (2).

Figure 4:
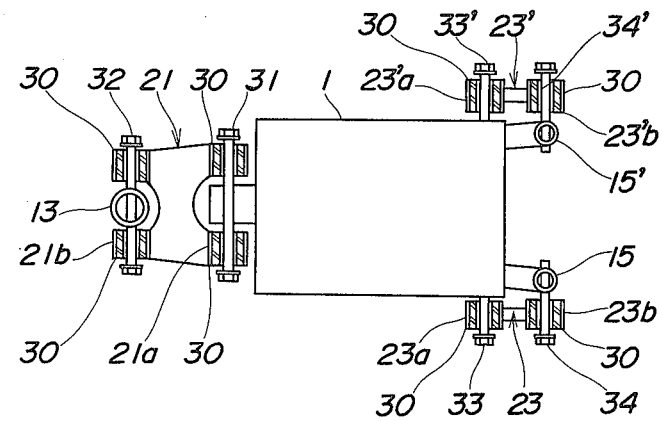
FIG. 4 is a schematic horizontal sectional view taken along line IV—IV of FIG. 3.

Links 20, 21, 22, 23 and 23' are provided as shown in FIGS. 3 and 4, each of which has two junctions. Those junctions, that is, the opposite ends of each link in this embodiment, are aligned with lines PE, PI, PJ and, PK extending radially from the center of percussion P, respectively, and the ends 20a, 21a, 22a, 23a and 23'a and the other ends 20b, 21b, 22b, 23b and 23'b are pivotally joined to the body of the engine 1 and the body 10 of the vehicle, respectively. More specifically, as shown in FIG. 4, one end 21a of the link 21, having two coaxial cylindrical parts, are pivotally supported by a shaft 31 extending transversely of the vehicle body 10 and through a front lower part of the engine 1 through cylindrical shock-absorbing members 30 formed, for example, of hard rubber and fitted in the cyclindrical parts, while the other end 21b having two coaxial cylindrical portions is pivotally supported on the down tube 13 by a shaft 32 extending through a lower end of the down tube 13 through shock-absorbing members 30. Although the illustration is omitted partly for simplicity, the link 20 also is similarly disposed in a manner that one end 20a and the other end 20b of the link 20, each having two cylindrical portions, are pivotally supported through shock-absorbing members 30 by a shaft inserted through an upper part of the engine 1 and by a shaft inserted through the triangular frame 12, respectively. The respective cylindrical ends 23a and 23'a and the respective other cylindrical ends 23b and 23'b of the link 23 and 23' are pivotally supported through shock-absorbing members 30 by bolts 33 and 33' fixed to the opposite sides of a rear end of the engine 1 at its lower part and extending transversely of the body 10 and by shafts 34 and 34' inserted through the corresponding lower tubes 15 (only one of the lower tubes 15, namely, the left lower tube 15, is shown), respectively. Since the construction is symmetrical with respect to the longitudinal axis of the vehicle, only the illustrated parts will be referred to in the following description. Although the illustration is partly omitted, the link 22 also is disposed similarly to the links 23 and 23', in that the cylindrical end 22a and the other cylindrical end 22b of the link 22 are pivotally supported by bolts fixed to the opposite sides of a rear end of the engine 1 at its upper part in a manner extending transversely of the body and by a shaft inserted through the main frame 14, respectively. The respective centers of these shafts 31 to 34' pivotally supporting the ends 20a to 23'a and the other ends 20b to 23'b of the links 20 to 23' are substantially disposed on the respective lines PE to PK extending radially from the center of percussion P.

In the above described manner, the engine 1 is suspended from the body 10 by those links 20 to 23' for turning about the center of percussion P, namely, the center O' of the hole 11b.

Stoppers 25 and 26 are arranged between the body of the engine 1 and the respective links 21, 23, and further stoppers, not shown, between the engine body and the link 23', respectively, to limit downward movement of the engine 1. More specifically, the stopper 25, for instance, is secured to a front lower part of the engine 1 for abutment with an upper intermediate surface of the link 21, while the stopper 26 and the stopper, not shown, are secured to portions of the respective lower tubes 15 and 15' facing the bottom surface of the engine 1 for abutment with the same bottom surface of the engine 1. These stoppers are formed of a material having high damping coefficient such as hard rubber.

Figure 5:
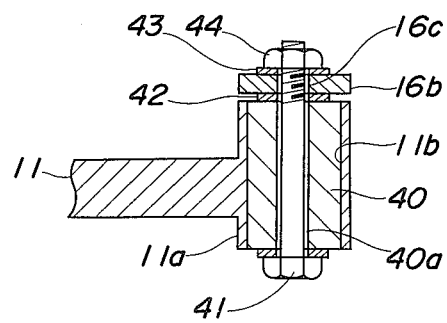
FIG. 5 is a fragmentary horizontal sectional view of the fitting part of an exhaust pipe shown in FIG. 3.

The exhaust pipe 16 is secured at one end 16a to the exhaust port 1" of the engine 1 and is provided at the other end with a mount 16b. As shown in FIG. 5, a bolt 41 is inserted through a hole 40a formed through a shock-absorbing member 40 fitted within the hole 11b formed in an end 11a of the step holder 11 and is also inserted through a hole 16c formed through the mount 16b. The bolt 41 has two washers 42 and 43 loosely fitted thereon at opposite sides of the mount 16b and also has a nut 44 fitted on its exposed tip, to thereby rotatably support the mount 16b on the end 11a of the step holder 11. That is, the mount 16b is supported for free pivotal movement about the center of percussion P.

The operation of the engine suspension system thus constructed according to the invention will be now described. When the engine is operated, the engine is caused to vibrate mainly by the primary inertial force F generated by the reciprocating motion of the reciprocating components of the engine 1. The crank weight 4 of the engine 1 revolves about the crankshaft to generate a centrifugal force f. Consequently, the resultant force F' is generated, which acts only perpendicularly to the line O'D connecting the center O' of the hole 11b of the step holder 11 (the center of percussion P) and the center of gravity G of the engine 1. Since the distance l between the intersecting point Q of the line of action OC of the resultant force F' and the line O'D and the center of gravity G, and the distance L between the center of gravity G and the center O' meet the condition defined by Equation (1), and since the engine 1 is supported by the links 20 to 23' for free turning or rocking movement about the center O', the magnitude of the resultant force F' varies with a change in the rotation of the crankshaft 9 and with the rotation of the crankshaft 9, the resultant force F' generated at the center O of the crankshaft acts alternately in a direction toward the point Q and in the opposite direction. Accordingly, the engine 1 is caused to vibrate on the links 20 to 23' alternately in opposite circumferential directions about the center O' of the hole 11b, namely, the center of percussion P, during its operation. That is, the resultant force F', namely, the primary inertial force F, is used for turning the engine 1, to thereby reduce the vibrations attributable to the primary inertial force F. Furthermore, since the links 20 to 23' are connected to the engine 1 through shock-absorbing members 30 and hence the links 20 to 23' do not impede the movement of the engine 1 at all, the transmission of vibrations from the engine 1 to the vehicle body 10 is minimized, to substantially shut off the vehicle body 10 from the engine vibrations. In FIG. 3, the perpendicular distance between the center of percussion percussion P and the driving chain 5 increases as the engine 1 moves downward and thereby the clockwise moment of the driving force of the driving chain 5 exceeds the counterclockwise moment of the deadweight of the engine 1. Consequently, a force occurs, which acts upon the engine 1 to lift it up. Thus, the deadweight of the engine is counterbalanced by the lifting force to reduce the load working on the engine supporting stoppers including the stoppers 25 and 26. Therefore, these stoppers can have a lengthened life and exhibit an enhanced vibration damping function to reduce the transmission of the engine vibrations to the vehicle body 10.

Still further, when the engine 1 is turned relative to the vehicle body 10, the exhaust pipe 16, which is joined at one end to the engine 1, is turned together with the engine 1 about the center of percussion P, therefore, no bending load attributable to the engine vibrations will be applied to the exhaust pipe 16.

Figure 7:
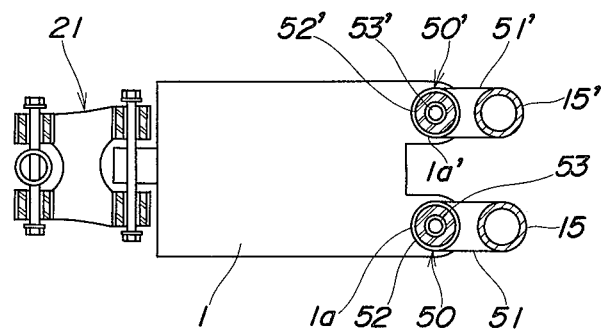
FIG. 7 is a schematic horizontal sectional view taken along line VII—VII of FIG. 6.
Figure 6:
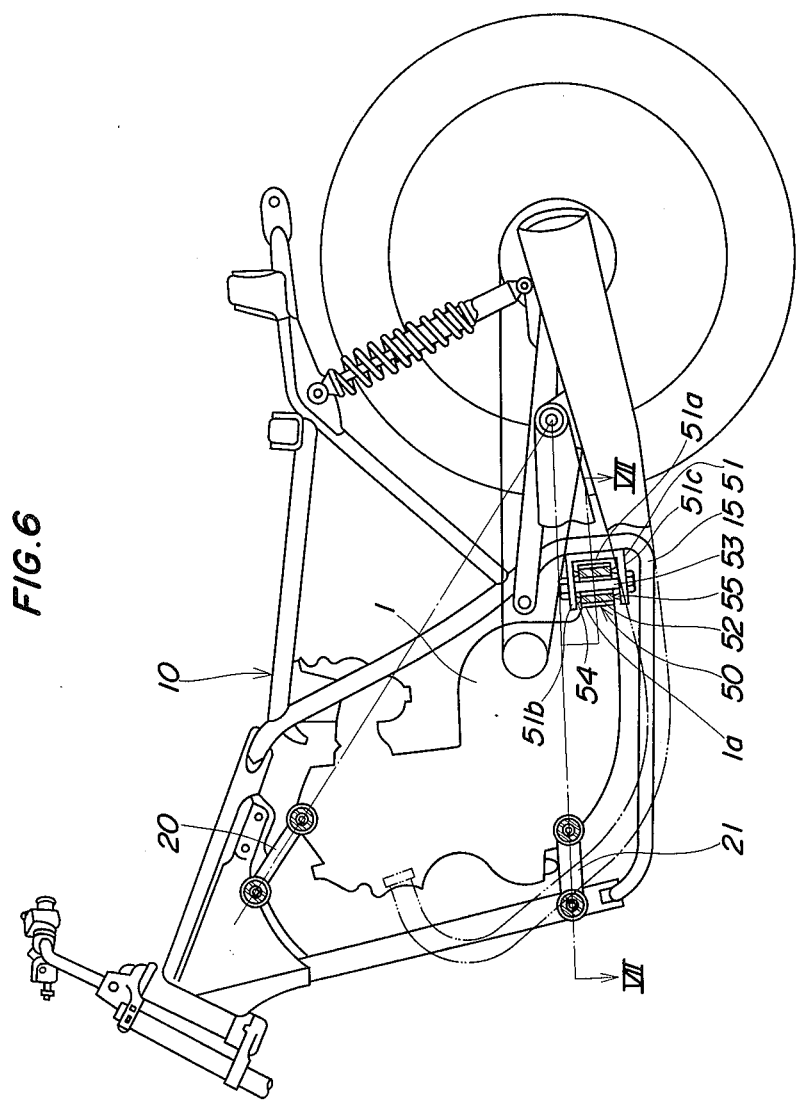
FIG. 6 is a schematic side elevation of another embodiment of an engine suspension system according to the present invention.

FIGS. 6 and 7 show another embodiment of the engine suspension system according to the invention. The construction of the embodiment of FIGS. 6 and 7 is similar to that of the preceding embodiment except that some of the links of the preceding embodiment are replaced by rubber mounts. The degree of engine vibrations, namely, the angular movements of the engine 1, is small at a location near the center of percussion P. Therefore, the engine 1 may have its rear part supported by rubber mounts 50 and 50' as shown in FIGS. 6 and 7, instead of links. Referring to FIGS. 6 and 7, the respective fixtures 51 and 51' of rubber mounts 50 and 50' are formed in a substantially U-shaped vertical longitudinal section and are secured to the respective front surfaces of the left and right lower tubes 15 and 15' behind the engine 1. Holes 1a and 1a' are formed in rear end portions of engine 1 at its opposite sides. Thus, the engine 1 is supported for vertical rocking movement on the fixtures 51 and 51' by means of bolts 53 and 53' fitted through the holes 1a and 1a' through shock-absorbing members 52 and 52'. The shock-absorbing members 52 and 52' are cylindrical members formed, for example, of hard rubber. Stoppers 54 and 55 are disposed between the top and bottom surfaces of the shock-absorbing member 52 and top and bottom brackets 51b and 51c extending parallel to each other integrally from the opposite ends of the central portion 51a of the fixture 51 toward the engine 1, respectively. Similarly, stoppers, not shown, are disposed between the shock-absorbing members 52' and the top and bottom brackets of the fixture 51'. These stoppers are provided to limit the up-and-down movement of the rear part of the engine 1.

In the embodiment of FIGS. 6 and 7, as described above, the enoine 1 has its front part supported by the links 20 and 21 constructed above and its rear part supported for up-and-down movement by the rubber mounts 50 and 50'. Therefore, as in the preceding embodiment, the engine 1 is allowed to move in circumferential directions about the center of percussion P, so that the engine vibration is reduced and the transmission of vibrations to the vehicle body 10 is minimized.

The invention as described hereinbefore provides various excellent effects as follows:

(1) Since the engine is suspended for free turning or rocking movement by means of links arranged in alignment with a plurality of straight lines extending radially from a center of percussion located at a predetermined position in the body of a vehicle and is allowed to move in circumferential directions about the center of percussion, the transmission of the engine vibration to the vehicle body can extremely effectively be minimized and the engine suspension system can be simple in construction.

(2) Since the mount of the exhaust pipe is pivotally supported at the center of percussion so that the exhaust pipe can pivotally move about the center of percussion together with the turning engine, no bending load is applied to the exhaust pipe, resulting in a lengthened service life of the exhaust pipe.

(3) Since the engine supporting stoppers are disposed so as to abut either against the associated links or against the bottom surface of the engine when the engine is moved downward and since the center of percussion is set approximately at the center of the chain-driven secondary reduction mechanism of the engine, the load on the stoppers is reduced by the driving reaction force of the reduction mechanism, lengthening the service life of the stoppers and enhancing the vibration damping function of same.

Obviously many modifications and variations of the present invention are possible in the light of the above disclosure. It is therefore to be understood that within the scope of the appended claims the invention may be practiced otherwise than as specifically described.

What is claimed is:

1. An engine suspension system for suspending an engine from the body of a vehicle including a framework, comprising; a plurality of links each having two junctions, said links each having said two junctions thereof located on corresponding one of a plurality of straight lines extending radially in different directions from a center of percussion of the engine located at a predetermined position in said body of said vehicle; a first joining means pivotally joining one junction of each of said links to said engine; and a second joining means pivotally joining the other junction of each of said links to said framework, whereby said engine is suspended for turning movement about said center of percussion to reduce the transmission of engine vibrations to said body of said vehicle.

2. An engine suspension system according to claim 1, wherein said engine has a cylinder, a crankshaft, reciprocating parts arranged to reciprocate axially of said cylinder to generate a primary inertial force, and a crank weight arranged to revolve about said crankshaft in unison therewith to generate a centrifugal force, said center of percussion being located at a location meeting the following equation:

$$l \times L = Ig/W$$

where $l$ is the distance between the intersection of the line of action of the resultant force of said primary inertial force and said centrifugal force and a straight line extending perpendicularly to said line of action through the center of gravity of said engine and said center of gravity, L is the distance between said center of gravity and said center of percussion located on said straight line, Ig is the moment of inertia of said engine about an axis passing through said center of gravity, and W is the weight of said engine.

3. An engine suspension system according to claim 1, wherein said two junctions of each of said links each comprise a cylindrical portion and each of said first and second joining means includes a shaft member inserted through a corresponding one of said cylindrical portions and a shock-absorbing member interposed between said corresponding cylindrical portion and said shaft member.

4. An engine suspension system according to claim 1 wherein said engine has an exhaust port and an exhaust pipe fixedly connected to said exhaust port at one end thereof and having a mount at the other end thereof, said system further including a third joining means for pivotally supporting said mount of said exhaust pipe to allow pivotal movement of said exhaust pipe about said center of percussion.

5. An engine suspension system according to claim 4, including a pair of step holders arranged at opposite sides of said body of said vehicle and behind said engine, said step holders having one end thereof fixed to said framework of said body of said vehicle, at least one of said step holders having the other end thereof holding said exhaust pipe, and wherein the center of percussion of said engine is coincident with said other end of said at least one step holder.

6. An engine suspension system according to claim 5, wherein said other end of said at least one step holder has a cylindrical portion, said mount of said exhaust pipe having a hole formed therein, said third joining means including a shaft member inserted through said cylindrical portion of said at least one step holder and said hole of said mount, and a shock-absorbing member interposed between said cylindrical portion of said at least one step holder and said shaft member, said mount of said exhaust pipe being pivotally connected to said other end of said at least one step holder by means of said shaft member and said shock-absorbing member.

7. An engine suspension system according to claim 1 wherein said engine has a rear end portion, said system further including a fourth joining means joining said rear end portion of said engine to said framework of said body of said vehicle in a manner allowing rocking movement of said rear end portion of said engine.

8. An engine suspension system according to claim 7, wherein said fourth joining means includes a pair of holding members fixed to a portion of said framework disposed opposite a rear end portion of said engine, a pair of shaft members each inserted through a corresponding one of holes formed in said rear end portion of said engine and supported by a corresponding one of said holding members, and a pair of shock-absorbing members each interposed between a corresponding one of said shaft members and a corresponding one of said holes formed in the engine.

9. An engine suspension system according to claim 1, wherein said engine has a bottom surface, said system including a first engine supporting stopper secured to said bottom surface of the engine for abutment with a corresponding one of said links disposed opposite said bottom surface of the engine, when said engine is moved downward, and a second engine supporting stopper secured to said framework for abutment with said bottom surface of the engine, when said engine is moved downward.

10. An engine suspension system according to claim 9, wherein said engine has a chain-driven secondary reduction mechanism including a driving chain, said center of percussion being located at a central portion of said secondary reduction mechanism.

11. An engine suspension system according to claim 10, wherein said center of percussion is located so as to meet the following equation:

$$T \times H \geqq W \times L$$

where T is the tension of the driving chain, H is the perpendicular distance between the center of percussion of said engine and the driving chain, W is the weight of said engine, and L is the distance between the center of gravity of said engine and the center percussion of said engine.

12. An engine suspension system according to claim 2 wherein said engine has an exhaust port and an exhaust pipe fixedly connected to said exhaust port at one end thereof and having a mount at the other end thereof, said system further including a third joining means for pivotally supporting said mount of said exhaust pipe to allow pivotal movement of said exhaust pipe about said center of percussion.

13. An engine suspension system according to claim 2 wherein said engine has a rear end portion, said system further including a fourth joining means joining said rear end portion of said engine to said framework of said body of said vehicle in a manner allowing rocking movement of said rear end portion of said engine.

14. An engine suspension system according to claim 2, wherein said engine has a bottom surface, said system including a first engine supporting stopper secured to said bottom surface of the engine for abutment with a corresponding one of said links disposed opposite said bottom surface of the engine, when said engine is moved downward, and a second engine supporting stopper secured to said framework for abutment with said bottom surface of the engine, when said engine is moved downward.

* * * * *